United States Patent Office 3,458,362
Patented July 29, 1969

3,458,362
BARRIER-TYPE METALLIC SULFIDE CONTAINING SEPARATOR FOR AN ALKALINE CELL
John T. Arms, Pasadena, Calif., assignor, by mesne assignments, to ESB Incorporated, Philadelphia, Pa., a corporation of Delaware
No Drawing. Filed Jan. 6, 1967, Ser. No. 607,652
Int. Cl. H01m 3/02
U.S. Cl. 136—146          15 Claims

ABSTRACT OF THE DISCLOSURE

A barrier-type separator containing a metallic sulfide which is useful in alkaline cells, particularly cells employing a silver oxide active material. The metallic sulfide reacts with active material metallic ions or particles present in the electrolyte to prevent them from short-circuiting the cell. The separator may also contain a thermoplastic resin binder and a cation exchange to improve its permeability. The metallic sulfide composition may be formed into a self-supporting thin film or it may be used to coat a supporting member.

Background of the invention

It is well known in the alkaline battery industry that certain electrode active materials, such as silver oxide, are slightly soluble in alkaline electrolyte, and therefore, active material metallic ions and/or colloidal particles may be present in the alkaline electrolyte and may deposit on the eectrode of opposite polarity causing a short circuit and self-discharge of the cell. The standard method for controlling this problem is to interpose a separator between the electrodes, with the separator material being permeable to the electrolyte ions but of controlled or limited permeability to the metallic ions and colloidal particles. Cellulosic materials such as cellophane are commonly employed as separator materials, but the metallic ions or particles from the electrode active material present in the electrolyte penetrate the cellulosic material and accelerate its oxidation and consequent deterioration. One of the products of the oxidation-reduction reaction between the cellulosic material and the active material metallic ions is the element metal which is highly conductive and tends to form a short circuit path through the separator material. Many attempts have been made to improve the oxidation resistance of cellulosic separator materials, but none of these have proven to be entirely satisfactory.

Summary of the invention

The general object of this invention is to provide an improved separator for an alkaline cell which resists penetration of the separator by active material metallic ions or colloidal particles present in the alkaline electrolyte. Other objects and advantages of the invention may be determined from the following description of the invention.

It has been discovered that a separator containing a substantial amount of a metallic sulfide is particularly effective in retarding short-circuiting or separator penetration by active material metallic ions and/or colloidal particles which may be present in the electrolyte of alkaline cells. The metallic sulfide which is employed in the separators of this invention should be substantially insoluble in the alkaline electrolyte, and preferably, it should react with the active material metallic ions and/or colloidal particles present in the electrolyte to form a reaction product which is also substantially insoluble in the alkaline electrolyte. In addition, the metallic sulfide should be substantially non-conductive. Examples of metallic sulfides which may be used in accordance with this invention are cadmium sulfide, nickel sulfide, lead sulfide, iron sulfide (ferrous and ferric), mercuric sulfide and zinc sulfide. The problem of migrating metallic ions and/or colloidal particles is especially troublesome in rechargeable alkaline systems employing silver oxide positive active material, and it is in such systems that separators containing a metallic sulfide are particularly effective, though they may be used in any alkaline system. Since separator failure is generally the limiting factor in rechargeable alkaline systems, the novel metallic sulfide containing separators of this invention provide better cycle life (i.e., more cycles) and greater total capacity. It is generally preferred that the metallic sulfide be selected to provide a separator which reacts with the active material metallic ions or particles present in the electrolyte to form a reaction product which is a poor electrical conductor, such as silver sulfide, because this increases the effectiveness of the separator as an electronic barrier.

The metallic sulfide containing separators may also be particularly useful in alkaline battery systems, both rechargeable and primary, which are subjected to elevated temperatures, for the higher temperature may increase the dissolution rate of the electrode active materials and thereby produce a higher concentration of active material metallic ions or particles in the alkaline electrolyt. While not limited thereto, the following description and examples will refer primarily to a silver-cadmium alkaline system in order to illustrate the advantages of this invention.

Detailed description

In preparing a metallic sulfide containing separator in the form of a self-supporting thin film, a metallic sulfide which is substantially insoluble in alkaline electrolyte is mixed with a thermoplastic resin binder to form a mixture which can be shaped into a thin film suitable for use as a separator. The thermoplastic resin which is used as a binder for the metallic sulfide must also be electrolyte resistant, i.e., resist hydrolysis in alkaline solution. In addition, it is preferred that the thermoplastic resin binder form a relatvely low viscosity melt when mixed with the metallic sulfide under heat and pressure in order that the mixture can be readily processed. Examples of thermoplastic resins which have been found to be satisfactory are polyethylene, polyethylene-polymethacrylic acid copolymer and butadiene-styrene elastomer.

In order to improve the permeability of the metallic sulfide separator and thus reduce its ohmic resistance, about 15 to about 60% of a cation exchange resin (based on the combined weight of the metallic sulfide, thermoplastic resin and cation exchange resin) is added to the metallic sudlfide-thermoplastic resin mixture. The cation exchange resin may be either a strong acid type, such as one containing sulfonic acid groups, or a weak acid type, such as powdered polymethacrylic acid. It is preferred to reduce the size of the cation exchange resin to a fine powder by passing it through a micropulverizer before incorporating it into the metallic sulfide-thermoplastic resin mixture. In addition, a water-soluble plastic, such as polyethylene oxide or other polymers based on ethylene oxide, may be added to the metallic sulfide-thermoplastic resin mix to increase its plasticity, facilitate mixing, and to provide space for the expansion of the ion exchange resin during equilibration. These water-soluble additives do not increase the separator resistance for they are readily removed from the mix after it is shaped by subjecting it to a water leach.

After the metallic sulfide-thermoplastic resin-cation exchange resin mass has been thoroughly mixed by heating and milling on a plastic mill, it is shaped into a thin film in any convenient manner. Typical of the methods which may be used are sheeting, calendering, extruding or rolling.

After the thin film is formed and laminated onto a supporting member as desired or necessary, the film is subjected to a water bath to remove the water-soluble plastic (if one was added to the mix), and thereafter, the film is equilibrated in an alkaline solution. It has been found that films having maximum swelling and lowest electrical resistance are obtained by high temperature equilibration in dilute alkaline solution. However, equilibration temperatures greater than about 160° F. may cause excessive swelling manifested as bubbles on the surface of the film. An equilibration bath of a 5% KOH solution maintained at about 125° F. has been found to be satisfactory. After the equilibration treatment, the film is dried and is then ready for use as an alkaline battery separator.

An alternate method for preparing metallic sulfide containing separators in accordance with this invention comprises coating a metallic sulfide composition onto one or both sides of a supporting member. Examples of suitable supporting members are nylon mesh and cellophane film such as that which is conventionally used as separator material in alkaline cells. The metallic sulfied coating composition may contain a curable resin binder and a curing agent therefor to attach the metallic sulfide to the substrate. In addition, it may also be necessary to incorporate a cation exchange resin into the coating composition to provide the necessary permeability. The coating composition may be calendered or otherwise spread on and pressed into the substrate, and if necessary, cured to firmly attach the metallic sulfide to the substrate. An alternative procedure for coating a substrate comprises forming a solution of the metallic sulfied in a solvent which may be applied to a suporting film member by impregnating, spraying or dip coating the film.

The following examples illustrate the preparation of metallic sulfide containing separator material and the advantages achieved when it is used as the separator in a rechargeable silver-cadmium alkaline cell. It should be noted that silver-cadmium "button" cells were used for the tests, and the conditions in these small cells, high oxygen concentration and a relatively dry atmosphere (no free electrolyte), accentuate the separator oxidation problem.

Example I

A metallic sulfide separator material was prepared from the following formulation.

| Ingredient: | Amount, wt. percent |
| --- | --- |
| Polyethylene (DYNK) | 24.5 |
| Cadmium sulfide (CdS) | 20.4 |
| Polymethacrylic acid (XE–97) | 55.1 |

The ingredients were mixed in dry form (no solvent) on a plastic mill maintained at about 250° F. After thorough mixing, the mass was calendered to form a sheet having 6 mil thickness. In this particular instance, the sheet was formed without a supporting member. After cooling to room temperature, the sheet was equilibrated in a 40% potassium hydroxide solution which resulted in an expansion of the sheet thickness from 6 mils to 19 mils.

Example II

The cadmium sulfide material of Example I, containing polymethacrylic acid cation exchange resin to improve permeability, was tested for its utility as a separator in an alkaline battery system and was compared to other known separator materials. Rechargeable silver-cadmium alkaline "button" cells were used to carry out the tests.

A 12-hour cycle was followed. The cells were charged for 10 hours at voltages ranging between 1.55 and 1.60 volts using a constant potential charger modified to permit a maximum current of 0.07 amp. The cells were discharged at 0.15 amp for 2 hours which represents approximately 70% of the cell capacity at the chosen rate of discharge. The cells were cycled until short circuits precluded further cycling. The following results were recorded:

| Separator | Dry thickness (in.) | Wet thickness (in.) | No. of cycles | Total amp hours |
| --- | --- | --- | --- | --- |
| Polyethylene (Permion 300) | .006 | .006 | 39 | 11.7 |
| Cellophane (PUD 0300) | .0036 | .012 | 88 | 26.4 |
| Silver treated Cellophane (PUD 0300) | .0036 | .012 | 76 | 22.8 |
| Fibrous sausage casing | .0055 | .014 | 66 | 19.8 |
| Silver treated fibrous sausage casing | .0055 | .014 | 96 | 28.8 |
| Cadium sulfide | .006 | .019 | 251 | 75.3 |

These results clearly demonstrate the outstanding superiority of the cadmium sulfide separator material in an alkaline battery having a silver positive electrode.

Example III

To supplement the cycle life evaluation of Example II, a cell was prepared utilizing the separator material of Example I, and it was subjected to a stand life test at an elevated temperature. The cell was cycled 3 times using a 0.100 amp discharge rate and then was placed in an oven maintained at 160° F. At the end of 14 days at the elevated temperature, the cell was removed, open circuit voltage recorded, and it was discharged at 0.100 amp to an end of discharge voltage of 0.70 v. The capacity at the end of the stand period was divided by the capacity before stand to determine the percentage capacity retention. After 14 days at 160° F. (a very severe test), this cell retained 92.3% of its capacity which is a particularly outstanding result.

Example IV

A cadmium sulfide separator material was prepared from the following formulation.

| Ingredient: | Amount, wt. percent |
| --- | --- |
| Polyethylene (Alathon 14) | 21.4 |
| Polyethylene oxide (WSR–35) | 7.2 |
| Cadmium sulfide (CdS) | 42.9 |
| Polymethacrylic acid (XE–97) | 28.5 |

The ingredients were mixed in dry form on a plastic mill maintained at about 250° F. After thorough mixing, the mass was calendered to form a sheet which was pressed onto both sides of a nylon mesh supporting member. This nylon supported sheet had a dry thickness of 8 mils. The sheet was immersed in a cold water bath for several hours (overnight) to remove the polyethylene oxide which had been added to plasticize the mass during mixing. After removal of the polyethylene oxide, the sheet was equilibrated in a 40% potassium hydroxide solution which resulted in an expansion of sheet thickness from 8 mils to 20 mils.

This material was evaluated as a separator in 3 silver-cadmium alkaline "button" cells in accordance with the procedure set forth in Example II. A single layer of the material was used as the separator, and all 3 cells yielded 183 cycles which is equivalent to 54.9 amp-hours.

Example V

A Cadmium sulfide separator material was prepared from the following formulation.

| Ingredient: | Amount, wt. percent |
| --- | --- |
| Polyethylene (Alathon 14) | 16.7 |
| Polyethylene oxide (WSR–35) | 5.6 |
| Cadmium sulfide (CdS) | 33.3 |
| Sulfonic acid type cation exchange resin (XE–69) | 44.4 |

The ingredients were mixed in dry form on a plastic mill maintained at about 250° F. After thorough mixing, the mass was calendered to form a sheet which was pressed onto both sides of a nylon mesh supporting member. This sheet had a dry thickness of 9 mils. The sheet was immersed in a cold water bath for several hours (overnight)

to remove the polyethylene oxide. After removal of the polyethylene oxide, the sheet was hot equilibrated in a 5% KOH solution maintained at about 125° F. The sheet thickness expanded from 9 mil to 13 mils.

This material was evaluated as a separator in 3 silver-cadmium alkaline "button" cells in accordance with the procedure set forth in Example II. A single layer of material was used in each cell with the following results:

| Cell No. | No. of cycles | Total amp.-hrs. |
|---|---|---|
| 1 | 189 | 56.7 |
| 2 | 224 | 67.2 |
| 3 | 224 | 67.2 |

These results demonstrate the outstanding cycle life achieved using a cadmium sulfide separator material in a rechargeable alkaline cell.

Example VI

A cadmium sulfide separator material was prepared from the following formulation:

Ingredient: Amount, wt. percent
    Polyethylene (Alathon 14) _____ 17.6
    Polyethylene oxide (WSR-35) _____ 11.8
    Cadmium sulfide (CdS) _____ 35.3
    Sulfonic acid type cation exchange resin (XE-69) _____ 35.3

The ingredients were mixed in dry form on a plastic mill maintained at about 250° F. After thorough mixing, the mass was calendered to form a sheet which was pressed onto both sides of a fibrous polyethylene (Pellon) supporting member. This sheet had a dry thickness of 10 mils. The sheet was immersed in a cold water bath for several hours (overnight) to remove the polyethylene oxide. After removal of the polyethylene oxide, the sheet was hot equilibrated in a 5% KOH solution maintained at about 125° F. The sheet thickness expanded from 10 mils to 14 mils.

This material was evaluated as a separator in 2 silver-cadmium "button" cells in accordance with the procedure set forth in Example II. A single layer of material was used in each cell, both of which yielded 283 cycles which is equivalent to 84.9 amp-hours. These outstanding results demonstrate the superiority of cadmium sulfide as a separator material for alkaline cells.

Example VII

A separator material utilizing nickel sulfide as the metallic sulfide ingredient was prepared from the following formulation.

Ingredient: Amount, grams
    Polyethylene (DYNK) _____ 50
    Nickel sulfide (NiS) _____ 75
    Polymethacrylic acid (XE-97) _____ 120

The ingredients were mixed in dry form on a plastic mill maintained at about 250° F. After thorough mixing, the mass was calendered to form an unsupported sheet having a 6 mil thickness. After cooling to room temperature, the sheet was equilibrated in a 40% potassium hydroxide solution which caused it to expand to a 19 mil thickness.

This nickel sulfide material was evaluated as a separator in 2 silver-cadmium "button" cells in accordance with the procedure set forth in Example II. A single layer of material was used in each cell, both of which yielded 77 cycles which is equivalent to 23.1 amp-hours.

Example VIII

A separator material utilizing zinc sulfide as the metallic sulfide ingredient was prepared from the following formulation.

Ingredient: Amount, grams
    Polyethylene (DYNK) _____ 60
    Zinc sulfide (ZnS) _____ 50
    Polymethacrylic acid (XE-97) _____ 110

The ingredients were mixed in dry form on a plastic mill maintained at about 250° F. After thorough mixing, the mass was calendered to form an unsupported sheet having a 6 mil thickness. After cooling to room temperature, the sheet was equilibrated in 40% potassium hydroxide solution which caused it to expand to a 19 mil thickness.

This zinc sulfide material was evaluated as a separator in a silver-cadmium "button" cell in accordance with the procedure set forth in Example II. The cell yielded 41 cycles which is equivalent to 12.3 amp-hours. This cell yielded substantially less capacity than those using the cadmium sulfide separator material, but this was expected because of the greater solubility of zinc sulfide in alkaline electrolyte.

Example IX

A cadmium sulfide separator material utilizing a styrene-butadiene copolymer as the plastic binder was prepared from the following formulation.

Ingredient: Amount, grams
    Styrene-butadiene (thermoplastic 200) _____ 100
    Cadmium sulfide (CdS) _____ 150
    Sulfonic acid type cation exchange resin (IRF-66M) _____ 300

These ingredients were mixed in dry form on a plastic mill maintained at about 250° F. After thorough mixing, the mass was formed into a sheet having a thickness of 13 mils (dry), which expanded to 16.1 mils when it was wet with 40% KOH electrolyte.

This material was used as a separator to test silver-cadmium "button" cells for cycle life. During the test, a layer of nylon absorbent material was placed on each side of the cadmium sulfide barrier-type separator adjacent to the silver and cadmium electrodes. The purpose of the absorbent was to retain electrolyte and to keep the electrodes wet during the cycling of the cell.

A substantially different cycling technique was used to test these cells. The cells were discharged automatically for 1 hour through a 6.1 ohm load which was equivalent to about a 30% discharge, and then the cells were automatically charged at 1.62 volts constant potential across each cell in series with a 4.0 ohm resistor for 5 hours. This automatic 1 hour discharge-5 hour charge cycle provided 4 cycles per day. A manual capacity check was made every 2 weeks at which time the cells were discharged through a 6.1 ohm resistor to a voltage of 0.6 volt (about a 100% discharge). The cells were then charged for 16 hours in accordance with the automatic charge conditions and returned to automatic cycling.

In the cycle life test of the above-described cadmium sulfide separator material, 5 cells were evaluated and yielded an average of 780 cycles.

Example X

A separator material utilizing an ethylene-methacrylic acid copolymer as the plastic binder was prepared from the following formulation.

Ingredient: Amount, grams
    Ethylene-methacrylic acid copolymer (Surlyn A) 75
    Cadmium sulfide (CdS) _____ 150
    Polyethylene oxide (WSR 35) _____ 25
    Sulfonic acid type cation exchange resin (IRF-66M) _____ 300

The ingredients were mixed in dry form on a plastic mill maintained at about 250° F. After thorough mixing, the mass was formed into a sheet, and thereafter, it was soaked in cold water overnight to remove the polyethylene oxide.

This material was evaluated for cycle life as in Example IX utilizing the same automatic 6 hour discharge-charge cycle. 5 cells were tested for cycle life, and these have yielded 1330 cycles and are still being cycled.

Several silver-cadmium "button" cells with cadmium sulfide separators, which had been cycled in a life test, were opened and the cadmium sulfide separators were analyzed. Photomicrographs indicated that on the silver electrode side of the separator there was a layer of metallic silver, the interior of the separator had a layer of silver sulfide ($Ag_2S$), and the cadmium electrode side of the separator was a layer of unreacted cadmium sulfide. This evidence supports the theory that the cadmium sulfide present in the separator traps the silver ions and/or colloidal particles present in the electrolyte and reacts with the silver to form silver sulfide. This clearly demonstrates that the metallic sulfide containing separators of this invention are particularly effective barrier-type separators for rechargeable alkaline cells.

Having completely described this invention, what is claimed is:

1. A battery separator for an alkaline system which consists essentially of a metallic sulfide, a thermoplastic resin binder for the metallic sulfide and an ion exchange resin.
2. A separator in accordance with claim 1 in which the ion exchange resin is a cation exchange resin which is present in amounts ranging from about 15 to about 60% by weight of the separator composition.
3. A separator in accordance with claim 2 in which the cation exchange resin is of the acid type.
4. A separator in accordance with claim 2 in which the cation exchange resin is polymethacrylic acid.
5. A separator in accordance with claim 2 in which the metallic sulfide is cadmium sulfide.
6. An alkaline cell having a positive electrode, a negative electrode, alkaline electrode and a separator between said positive and negative electrodes, the improvement therein which comprises employing a separator containing a metallic sulfide, said metallic sulfide being substantially insoluble in alkaline electrolyte.
7. An akaline cell in accordance with claim 6 in which the metallic sulfide in cadmium sulfide.
8. An alkaline cell in accordance with claim 6 in which the separator contains an ion exchange resin in amounts ranging from about 15 to about 60% by weight of the separator composition.
9. An alkaline cell in accordance with claim 2 in which the ion exchange resin is a cation exchange resin.
10. An alkaline cell in accordance with claim 9 in which the separator also contains a thermoplastic resin binder for the metallic sulfide.
11. An alkaline cell in accordance with claim 8 in which the metallic sulfide is cadmium sulfide.
12. An alkaline cell in accordance with claim 8 in which the metallic sulfide is nickel sulfide.
13. An alkaline cell in accordance with claim 8 in which the metallic sulfide is lead sulfide.
14. An alkaline cell in accordance with claim 8 in which the metallic sulfide is iron sulfide.
15. An alkaline cell in accordance with claim 8 in which the metallic sulfide is mercuric sulfide.

References Cited

UNITED STATES PATENTS

| | | | |
|---|---|---|---|
| 2,816,154 | 12/1957 | Mendelsohn | 136—146 XR |
| 2,915,579 | 12/1959 | Mendelsohn | 136—146 |
| 3,073,884 | 1/1963 | Pinkerton | 136—137 XR |
| 3,269,869 | 8/1966 | Mendelsohn | 136—146 |

WINSTON A. DOUGLAS, Primary Examiner

D. L. WALTON, Assistant Examiner

U.S. Cl. X.R.

260—2.2, 37